INVENTORS
KENNETH L. SHRIDER
ELMO E. MOYER
BY Woodling, Krost, Granger and Rust
ATTORNEYS 3,384,802
MOTOR CONTROL CIRCUIT SUPPLIED WITH
RECTIFIED POWER AND CONTROLLED
FIRING ANGLE
Kenneth L. Shrider, Mayfield Heights, Ohio, and Elmo E. Moyer, Saratoga Springs, N.Y., assignors to Reliance Electric and Engineering Company, a corporation of Ohio
Filed Mar. 30, 1965, Ser. No. 443,893
23 Claims. (Cl. 318—345)

ABSTRACT OF THE DISCLOSURE

The disclosure shows a motor control circuit which is exceptionally simplified yet with good speed regulation. A semi-conductor amplifier controls the reset current for a saturable reactor, in turn controlling the firing angle of a thyristor supplying half wave energy to a direct current motor. The saturable reactor reset circuit is simplified with only a single winding on the saturable reactor and the control voltage supplied to the semi-conductor amplifier is applied through the cathode-gate path of the thyristor. A bleeder resistor provides supplementary reset current to the reactor during the time of conductive carryover of the armature current. A main circuit breaker is not used, instead a switch has two poles, one of which shorts the gate to the cathode of the thyristor during off conditions and the other pole discharges a capacitor during off conditions, and during on conditions the capacitor is charged to establish a speed reference voltage.

---

The invention relates in general to a motor control circuit and more particularly to an electric motor operable from a rectified alternating current source.

Many motor control circuits have heretofore been devised especially for use with direct current motors because such direct current motors lend themselves particularly to variable speed systems. An early form of variable speed system was the Ward-Leonard system of an alternating current motor driving a direct current generator which had a variable output voltage to a direct current motor which was driven at variable speeds in accordance with this variable generator output voltage. Later full-wave rectifier systems were used with gas tubes supplying the rectified current to the direct current motor. For small motors, however, the cost of the rectifier system and control system necessary therefor exceeded the cost of the motor itself and made variable speed motor systems uneconomical for the lower horse power ranges and especially for fractional horse power ranges.

Accordingly, an object of the present invention is to provide a motor control circuit which obviates the disadvantage of an expensive motor control system yet which provides a wide speed range to a direct current motor and also provides a feed back for good speed regulation.

Another object of the invention is to provide a motor control circuit economically usable with fractional horse power direct current motors.

Another object of the invention is to provide a motor control circuit for use with half-wave rectified energy supplied to a direct current motor.

Another object of the invention is to provide a motor control circuit usable with semiconductor controlled rectifiers and capable of driving a motor in a wide speed range from high speed to a very low speed yet with good speed regulation throughout the full range of no load to full load armature current.

Another object of the invention is to provide a motor control circuit for a motor operable through a controlled rectifier in turn controlled by a saturable reactor with supplementary means to provide reset of the saturable reactor to achieve low current to the motor.

Another object of the invention is to provide a motor control circuit for a motor supplied with current from a semiconductor controlled rectifier in which the motor is permanently connected in series with a controlled rectifier across the alternating current line and in which a switch is provided in the gate circuit of the controlled rectifier to make certain that the controlled rectifier is rendered non-conductive in the off position of the switch and in which the switch means makes certain that the motor is gradually accelerated when turned to the on position.

Another object of the invention is to provide a control circuit for a motor supplied through controlled rectifier and with a speed reference voltage compared against the armature voltage and supplied to control a transistor in the control circuit through the cathode-gate path of the controlled rectifier.

Other objects and a fuller understanding of the invention may be had by referring to the following description and claims, taken in conjunction with the accompanying drawings, in which:

Figure 1:
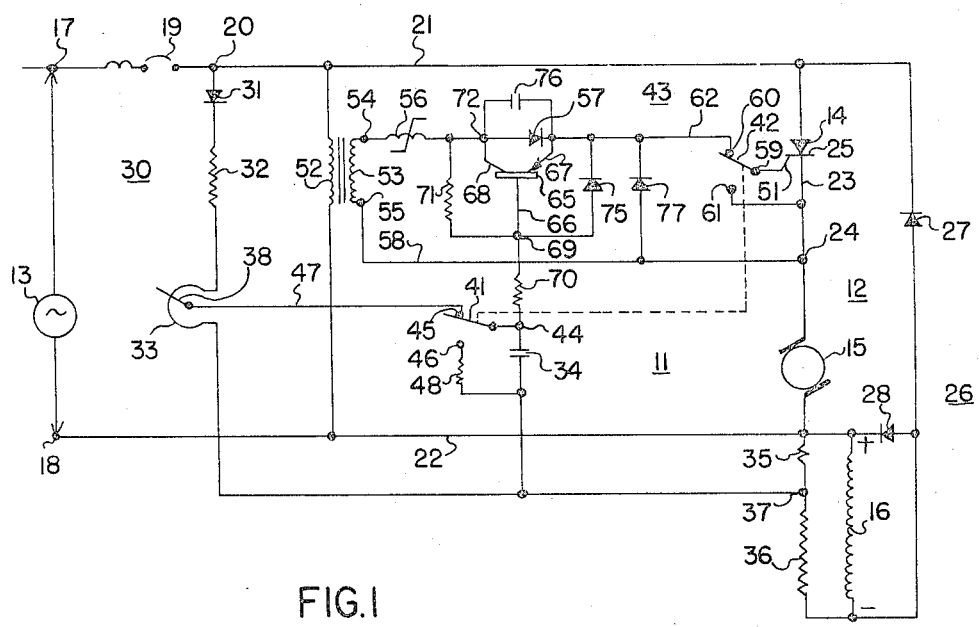
FIGURE 1 is a schematic diagram of a circuit embodying the invention.

FIGURE 1 illustrates schematically a motor control circuit 11 utilizing the invention. This motor control circuit 11 supplies energy to a direct current motor 12 from an alternating current source 13 through a rectifier 14. The rectifier 14 is a solid-state device, namely a semiconductor controlled rectifier, which may be a silicon controlled rectifier. The direct current motor 12 has an armature winding 15 and a field winding 16. The alternating current source 13 supplies a single phase alternating current voltage to terminals 17 and 18. Terminal 17 is connected through a circuit breaker 19 to a terminal 20. Conductors 21 and 22 are connected to terminals 20 and 18, respectively, with conductor 21 connected to the anode of the controlled rectifier 14. A conductor 23 connects the cathode 25 of the controlled rectifier 14 to one terminal 24 of the armature winding 15 and conductor 22 is connected to the other terminal of the armature winding 15. A field winding energization circuit 26 includes a diode rectifier 27 poled to conduct current through the field winding 16 from terminal 18 to terminal 20. This conduction will take place when terminal 18 is positive with respect to terminal 20 and accordingly the upper end of the field winding 16 will be positive with respect to the lower end in the FIGURE 1. A back rectifier 28 is connected across the field winding 16 to provide continuity of field winding current during the negative half cycles when terminal 18 is negative relative to terminal 20.

A reference voltage circuit 30 is provided and includes a diode rectifier 31, a series resistor 32, a potentiometer 33 and a capacitor 34. Voltage divider resistors 35 and 36 are connected across the field winding 16 and interconnected at a terminal 37. Because of the polarity of the field winding 16, the terminal 37 has a small negative direct current potential relative to the potential of conductor 22. The diode 31 and resistor 32 and potentiometer are connected in series between terminal 20 and terminal 37, with diode 31 poled to conduct current toward terminal 37 and through resistor 35 to the terminal 18. This establishes a positive direct current half-wave voltage with respect to terminal 18 at the movable blade 38 of the potentiometer 33. This half-wave voltage is impressed across the capacitor 34 which filters this voltage to maintain a substantially constant direct current reference voltage. In this motor control circuit 11 it is used as a speed reference voltage.

A double-pole double-throw on-off switch 41–42 is provided in the motor control circuit. One pole 41 is provided in this reference voltage circuit 30 and another pole 42 of this switch is provided in the firing circuit 43 for the controlled rectifier 14. The switch pole 41 has the switch blade thereof connected to a terminal 44 and has on and off terminals 45 and 46, respectively. The on terminal 45 is connected by a conductor 47 to the movable blade 38 of the potentiometer 33. The off terminal 46 is connected through a discharge impedance of resistor 48 across the capacitor 34. Thus in the off position of the switch pole 41 the capacitor 34 will be promptly discharged through resistor 48.

The firing circuit 43 for the controlled rectifier 14 controls the firing voltage applied to the gate 51 of the controlled rectifier 14. This firing circuit 43 includes a transformer primary 52 connected across the conductors 21 and 22. The secondary 53 of this transformer is preferably a low voltage secondary and has terminals 54 and 55. Terminal 54 is connected through a saturable reactor 56, through a diode 57 and the switch pole 42 to the gate 51. Terminal 55 is connected by a conductor 58 to the cathode 25 of controlled rectifier 14. The switch pole 42 has the common terminal 59 thereof connected to the gate 51 and has on and off terminals 60 and 61, respectively. The on terminal 60 is connected by a conductor 62 to the cathode of the diode 57. The off terminal 61 of the switch pole 42 is connected to the cathode of the controlled rectifier 14.

A semiconductor amplifier shown as a transistor 65 is provided in the firing circuit 43 and this transistor includes base, emitter and collector electrodes 66, 67 and 68, respectively. The emitter-to-collector path of this transistor is connected across the diode 57 in reverse polarity thereto and the base 66 is connected to a terminal 69 and then through a current limiting resistor 70 to the terminal 44. A bleeder resistor 71 is connected between terminal 69 and terminal 72 at the junction of the saturable reactor 56 and the collector 68. A protective diode 75 is poled to conduct current from the base 66 to the emitter 67 to minimize the reverse voltage which might appear across these electrodes. A capacitor 76 may be added across the diode 57 to absorb any small transient voltages appearing across the emitter and collector 67 and 68. A diode 77 is poled to conduct current from the conductor 58 to the conductor 62 to complete the circuit path through the transistor from the transformer secondary 53 for reset current through the saturable reactor 56.

*Operation*

The reference voltage circuit 30 establishes a direct current control voltage or reference voltage across the capacitor 34. This may be varied by movement of the potentiometer blade 38. In this motor control circuit 11 the reference voltage is used as a speed reference voltage. A voltage responsive to a motor condition is obtained from the motor 12. In this circuit 11 it is shown as a voltage responsive to the speed of the motor or the counter E.M.F. of the motor. This armature voltage may be obtained quite simply across the terminals of the motor, namely that voltage appearing on conductors 22 and 23, which is the same as the voltage at terminals 18 and 24. The reference voltage and the armature voltage are connected in voltage opposition and the difference thereof is applied to the input of the amplifier, namely across the base 66 and emitter 67 of the transistor 65 through the cathode 25-gate 51 path of the controlled rectifier 14. The resistor 35 establishes at terminal 37 a small negative potential relative to conductor 22. As the potentiometer blade 38 is rotated clockwise it establishes an increasing direct current reference voltage across the capacitor 34. The motor control circuit 11 is constructed to utilize this as a motor speed increasing signal. As the potentiometer blade is rotated counterclockwise to the zero speed position, this small negative voltage across resistor 35 provides the necessary negative voltage for a zero speed reference. It provides sufficient negative potential to bias the transistor 65 into full conduction.

The firing circuit 43 supplies firing current through the saturable reactor 56 to the gate 51 and cathode 25 of the controlled rectifier 14. This firing current may flow when terminal 54 of secondary 53 is positive. This is also during that half cycle when terminal 20 is positive relative to terminal 18. This will be when a positive voltage is applied to the anode of the controlled rectifier 14. This is illustrated in FIGURE 2 by a curve 85 of voltage applied from the source 13.

Figure 2:
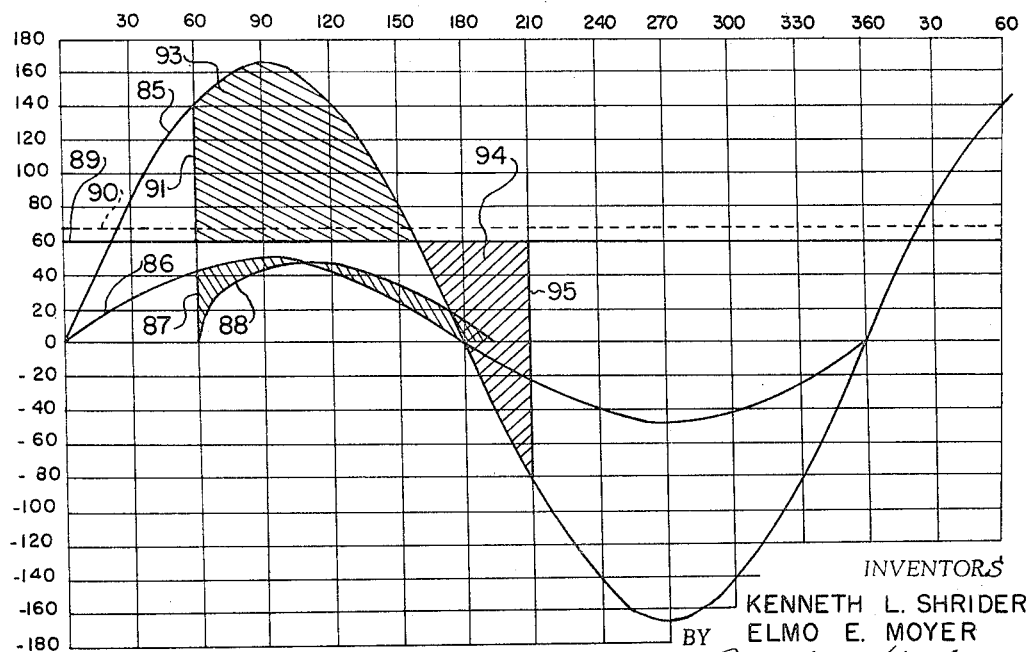
FIGURE 2 is a graph of voltages in the motor control circuit of FIGURE 1.

A curve 86 is also shown on the voltage diagram of FIGURE 2 and this illustrates the voltage of the secondary 53. This may be a voltage to an expanded scale because of the low voltage on this secondary 53. The sense of the firing circuit 43 is that turning on the transistor 65 turns off the controlled rectifier 14. Because the speed reference voltage across potentiometer 33 is compared with the armature voltage across terminals 18 and 24, the difference of these two voltages is that which controls the bias on the transistor 65. The firing current to the gate 51 is applied from the secondary terminal 54 through the saturable reactor 56 and the diode 57 to this gate 51. This firing pulse is applied at the time that the saturable reactor 56 saturates. This has been indicated, for example, as occurring at the 60 degree point 87 on the curve of FIGURE 2. Prior to this time there has been a small current flow through the saturable reactor from the secondary terminal 54. This flows to the right through the reactor 56 as shown in FIGURE 1, through the diode 57, the gate-cathode path of the controlled rectifier 14 and then return to the terminal 55. This is a small current flow, insufficient to cause turn-on of the controlled rectifier 14. This current flow is in the "set" direction through the reactor 56. When the reactor saturates, e.g. at the 60 degree point 87, the impedance of this reactor suddenly collapses and a firing pulse of current as shown by the curve 88 is applied to the gate 51. This fires the rectifier 14 and this rectifier continues to conduct for the remainder of the positive half cycles of applied anode voltage and into the negative line voltage alternation dependent upon the stored energy in the armature inductance. FIGURE 2 shows an idealized counter E.M.F. voltage 89 shown as a straight line. The average terminal voltage of the armature 15 is shown by the dotted line 90. This takes into account the IR drop through the armature. The firing point 87 on the saturable reactor 56 establishes a corresponding firing point 91 of the controlled rectifier 14. During the time that the controlled rectifier 14 is firing, this voltage rises above the straight line 90 because of the greater impressed voltage on the armature.

Because of inductive carryover caused by the inductance of the armature winding 15, armature current does not cease to flow immediately at the 180 degree point. The current carries over for some finite period. In this FIGURE 2 it is illustrated as carrying over for an additional 30 degrees to the 210 degree point. The two shaded areas 93 and 94 are generally equal, with the shaded area 93 somewhat larger. Area 93 lies above the line 89 and below curve 85, and shaded area 94 lies below line 89 and above curve 85. Shaded area 94 terminates at a point 95 at which the flux collapses. The shaded area 93 represents a volt-second area of absorption and the shaded area 94 represents the volt-second area of discharge of energy in the armature winding 15. It will be noted that during the shaded area 94 the applied anode voltage at terminal 20 is negative relative to the potential of the terminal 24 of armature 15.

The saturable reactor 56 is reset each half cycle. In this case it is reset during the negative half cycles, namely when terminal 20 is negative relative to terminal 18. This will be when secondary terminal 54 is negative relative to terminal 55. During these half cycles the transistor 65 may conduct and this will cause current flow through the reactor 56 to the left as viewed in FIGURE 1. The transistor 65 is biased by the voltage applied by the emitter 67 and base 66. The speed reference voltage across capacitor 34 is compared to the terminal voltage of armature 15. This voltage is applied through the cathode-gate path of the controlled rectifier 14 onto the base and emitter. If the armature terminal voltage is too high, representing too high a motor speed, then this will apply an increased positive voltage on the emitter 67 biasing the transistor to greater conduction. This causes greater reset of the reactor 56. This retards the firing point 87 and 91 and decreases the average current output of the controlled rectifier 14. Thus this restores the armature 15 to the desired reduced speed. Conversely, if the load on the motor increases and slows the speed thereof, the terminal voltage will drop and this will apply an increased positive voltage on the base 66. This tends to turn off the transistor decreasing the reset current through reactor 56 and thus moving the firing point to the left closer toward the zero degree point of the applied voltage. This turns on the controlled rectifier to a greater extent to supply increased current to the motor armature 15 to sustain the increased load.

The inductive carryover of the armature current illustrated partly by the shaded area 94, causes problems in the firing circuit 43. It will be noted that in the period of 180 degrees to 210 degrees the terminal 20 is negative relative to terminal 18. During this time the transistor 65 should be conducting in order to provide reset current to the reactor 56. However, the transistor 65 can not conduct during this 30 degree period. This is because the transistor emitter 67 it tied to the gate 51 and because the controlled rectifier 14 is conducting at that time, the potential of gate 51 and emitter 67 will be tied to the potential of terminal 20. Because terminal 20 is negative at this time with respect to the transistor base electrode 66, this prevents the transistor 65 from being biased into conduction. To obtain minimum current through the armature 15 and hence minimum speed of the motor 12, it is necessary to turn off the controlled rectifier to a minimum conduction which means turning on the transistor 65 to a maximum. A maximum reset of the reactor 56 is desired. Yet because of the inductive carryover beyond the 180 degree point, a maximum amount of reset current through the transistor 65 is difficult to obtain. Because the time and volt-second area available for the reset of the reactor 56 is limited, then any inhibiting of reset of the reactor 56 tends to increase the conduction through the controlled rectifier 14.

This is manifested by an elongation, at both ends, of the conduction period of the controlled rectifier. The elongation into the negative half cycle results in a further decrease in the reset volt-seconds. This could result in instability at the low end of the speed range of the motor 12.

The bleeder resistor 71 overcomes this instability and provides a supplemental means for resetting the reactor 56. The bleeder resistor 71 provides a path from the speed reference voltage at terminal 44 so that reset current may flow to the left in FIGURE 1 through the reactor 56. This will occur even during the initial portion of the negative half cycle. Accordingly, sufficient reset current is supplied to the reactor 56 to achieve maximum reset thereof and hence minimum current to the armature winding 15. This current flows from terminal 44 through resistors 70 and 71, the reactor 56, the secondary 53, armature winding 15, resistor 35 and return through the capacitor 34. The value of this resistor 71 is chosen to be of the same order of magnitude as the value of the current-limiting resistor 70. Resistor 71 may be of fairly high impedance, e.g. 300,000 ohms, because only a small bleeder current is required to complete the saturation of the reactor 56. The bulk of the reactor reset current still is supplied through the transistor 65 in accordance with the difference of the speed reference voltage and the armature voltage.

The switch 41–42 is an on-off switch for the entire motor control circuit 11. In this economical motor control circuit there is no main contactor for the motor 12 to disconnect it from the voltage source 13. The on-off switch 41–42 is a switch of small current rating merely controlling the control current, not the load current. The switch 41 is shown in the on position whereat the potential of the potentiometer blade 38 is applied to the capacitor 34. When the switch 41 is moved to the off terminal 46, this connects the discharge resistor 48 across the capacitor 34. This completely discharges this capacitor. When the switch is next thrown to the on position, this capacitor will charge rather gradually and thus give a controlled acceleration to the motor 12. Accordingly the circuit prevents a sudden application of full current to the armature 15 which could be harmful to the motor or the control circuit 11. The second pole 42 of the switch controls the potential of the gate 51. In the off position the gate 51 is tied to the cathode 25 of the rectifier 14. This positively prevents any firing of this rectifier 14 and hence the motor 15 is definitely turned off. When the switch 42 is moved to the on position, the gate 51 is connected to the reactor 56 and may then receive firing pulses 88. This on-off switch provides still another safety feature in making certain that the reactor 56 is always reset. Since the firing circuit to the gate 51 is broken when switch 42 is in the off position, the only current which may flow through the reactor 56 will be reset current, for example, this may be through bleeder resistor 71 or through the transistor 65. This makes certain that the reactor will not be completely "set" at the instant of turning the switches 41–42 to the on position. If the reactor could be in the "set" condition, then a firing pulse would immediately be passed through reactor 56 to gate 51 and controlled rectifier 14 would conduct full-on. If the speed control potentiometer happened to have been left in the full-on position, this would give a large pulse of current to the armature winding 15. The armature would attempt to immediately accelerate to full speed drawing a heavy current. The connections of the switch 42 preclude this happening by making certain that the reactor 56 will always be maintained at or near the maximum reset condition.

This motor control circuit of FIGURE 1 has been found quite satisfactroy for motors in the ⅛ to 1½ horsepower range, providing good speed regulation of a few percent between full load and no load. Also, the motor control circuit 11 may readily be used on different alternating current source voltages with only minor changes in the circuit values. The firing circuit 43 with the exception of the transformer primary 52 may remain the same for either 117 volt or 230 volt input from the source 13. In the reference voltage circuit 30 the resistor values may be changed to provide the appropriate reference voltage range across the capacitor 34. The armature voltage may double from approximately 75 volts for a 117 volt alternating current input to about 150 volts for a 230 volt alternating current input.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A motor control circuit for an electric motor having an armature winding operable from a rectified alternating current source comprising, in combination, means for developing from said alternating current source a control voltage, a semiconductor controlled rectifier for supplying rectified energy from said alternating current source to said armature winding, a gate and a cathode on said controlled rectifier, a firing circuit to fire said controlled rectifier, an amplifier in said firing circuit to control said controlled rectifier, and means connecting said control voltage through said cathode-gate path of said controlled rectifier to the input of said amplifier to control the firing angle of said controlled rectifier.

2. A motor control circuit for an electric motor having an armature winding operable from a rectified single phase alternating current source comprising, in combination, means for developing from said alternating current source a variable direct current reference voltage, a semiconductor controlled rectifier for supplying half-wave energy from said alternating current source to said armature winding, a gate and a cathode on said controlled rectifier, a firing circuit to fire said controlled rectifier, a saturable reactor in said firing circuit, a transistor having emitter, collector and base electrodes means connecting said emitter to said gate, and means connecting said reference voltage in series with and in opposition to the voltage of said armature winding and through said cathode-gate path of said controlled rectifier to said base and emitter electrodes of said transistor establishing the conduction periods of said transistor to control the amount of reset current through said saturable reactor to control the firing angle of said controlled rectifier.

3. A motor control circuit for a shunt motor having an armature winding and a field winding both operable from a rectified single phase alternating current source comprising, in combination, half-wave rectifier means for energizing said field winding, means for developing from said alternating current source a variable direct current speed reference voltage, a silicon controlled rectifier for supplying half-wave energy from said alternating current source to said armature winding, a gate and a cathode on said controlled rectifier, a firing circuit to fire said controlled rectifier, a saturable reactor in said firing circuit and saturable to establish firing of said controlled rectifier, a transistor having emitter, collector and base electrodes, means connecting said emitter to said gate, and means connecting said speed reference voltage in series with and in opposition to the voltage of said armature winding and through said cathode-gate path of said controlled rectifier to said base and emitter electrodes of said transistor to establish the conduction periods of said transistor to control the amount of reset current through said saturable reactor to control the firing angle of said controlled rectifier.

4. A motor control circuit for an electric motor having an armature winding operable from a rectified alternating current source, said control circuit comprising, in combination, a controlled rectifier, a saturable reactor connected to control the firing of said controlled rectifier, means to saturate said saturable reactor to fire said controlled rectifier during the half cycles of positive applied voltage on the anode of said controlled rectifier, means deriving a speed reference voltage from said alternating current source, a semiconductor amplifier connected to said reactor, means in accordance with said speed reference voltage to control the current through said amplifier during the opposite half cycles to reset said saturable reactor, a maximum amount of reset of said reactor being required to obtain a maximum delay in the firing angle of said controlled rectifier and hence a minimum current to said motor, a bleeder resistor bypassing said semiconductor amplifier and connected to said speed reference voltage to supply a bleeder reset current through said saturable reactor during said given period in order to increase the reset of said saturable reactor to achieve a minimum current to said motor, and supplemental means to supply reset current through said saturable reactor during said opposite half cycles.

5. A motor control circuit for an electric motor having an armature winding operable from a rectified alternating current source, said control circuit comprising, in combination, a controlled rectifier, a saturable reactor connected to control the firing of said controlled rectifier, means to saturate said saturable reactor to fire said controlled rectifier during the half cycles of positive applied voltage on the anode of said controlled rectifier, means deriving a control voltage from said alternating current source, a semiconductor amplifier connected to said reactor, means in accordance with said control voltage to control the current through said amplifier during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period conditioning said amplifier to inhibit conduction therethrough and thence to inhibit reset of said saturable reactor during said given period, a maximum amount of reset of said reactor being required to obtain a maximum delay in the firing angle of said controlled rectifier and hence a minimum current to said motor, and a bleeder resistor connected to said control voltage to supply a bleeder reset current through said saturable reactor during said given period in order to increase the reset of said saturable reactor to achieve a minimum current to said motor.

6. A motor control circuit for an electric motor having an armature winding operable on half wave energy through a controlled rectifier from a single phase alternating current source, said control circuit comprising, in combination, a saturable reactor connected to control the firing of said controlled rectifier, means to saturate said saturable reactor to fire said controlled rectifier during the half cycles of positive applied voltage on the anode of said controlled rectifier, a direct current voltage source, a semiconductor amplifier connected to said reactor, means responsive to said direct current voltage to control the current through said amplifier during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period biasing said amplifier to prevent conduction therethrough and thence to prevent reset of said saturable reactor during said given period, a maximum amount of reset of said reactor being required to obtain a maximum delay in the firing angle of said controlled rectifier and hence a minimum current to said motor, and a bleeder resistor connected to said direct current voltage source to supply a bleeder reset current through said saturable reactor during said given period in order to increase the reset of said saturable reactor to achieve a minimum current to said motor.

7. A motor control circuit for an electric motor having an armature winding operable on half wave energy through a controlled rectifier from a single phase alternating current source, said control circuit comprising, in combination, a saturable reactor connected to control the firing of said controlled rectifier, means to saturate said saturable reactor to fire said controlled rectifier during the half cycles of positive applied voltage on the anode of said controlled rectifier, means for developing from said alternating current source a variable direct current reference voltage, a semiconductor amplifier connected to said reactor, means comparing said reference voltage and a voltage responsive to a condition of said motor to control the current through said amplifier during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period biasing said amplifier to prevent conduction therethrough and thence to prevent reset of said saturable reactor during said given period, a maximum amount of reset of said reactor being required to obtain a maximum delay in the firing angle of said controlled rectifier and hence a minimum current to said motor.

and a bleeder resistor connected to said reference voltage to supply a bleeder reset current through said saturable reactor during said given period in order to increase the reset of said saturable reactor to achieve a minimum current to said motor.

8. A motor control system for an electric motor having an armature winding operable from a rectified single phase alternating current source comprising, in combination, means for developing from said alternating current source a variable direct current reference voltage, a semiconductor controlled rectifier for supplying half-wave energy from said alternating current source to said armature winding, a gate and a cathode on said controlled rectifier, a control circuit connected to said gate and cathode to control the firing of said controlled rectifier, a saturable reactor in said control circuit, means in said control circuit to saturate said saturable reactor to fire said controlled rectifier during the half cycles of positive applied voltage on the anode of said controlled rectifier, a semiconductor amplifier in said control circuit, means in said control circuit comparing said reference voltage and a voltage responsive to a condition of said motor to control the current through said amplifier during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period biasing said amplifier to prevent conduction therethrough and thence to prevent reset of said saturable reactor during said given period, a maximum amount of reset of said reactor being required to obtain a maximum delay in the firing angle of said controlled rectifier and hence a minimum current to said motor, and a bleeder resistor connected to said reference voltage to supply a bleeder reset current through said saturable reactor during said given period in order to increase the reset of said saturable reactor to achieve a minimum current to said motor.

9. A motor control system for a shunt motor having an armature winding operable from a rectified single phase alternating current source comprising, in combination, means for developing from said alternating current source a variable direct current speed reference voltage, a semiconductor controlled rectifier for supplying half-wave energy from said alternating current source to said armature winding, a gate and a cathode on said controlled rectifier, a control circuit connected to said gate and cathode to control the firing of said controlled rectifier, a saturable reactor in said control circuit, means in said control circuit to saturate said saturable reactor to fire said controlled rectifier during the half cycles of positive applied voltage on the anode of said controlled rectifier, a transistor having emitter, collector and base electrodes, means in said control circuit comparing said speed reference voltage and a voltage responsive to the voltage of said armature winding to control the current through said transistor during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period biasing said transistor to prevent conduction therethrough and thence to prevent reset of said saturable reactor during said given period, a maximum amount of reset of said reactor being required to obtain a maximum delay in the firing angle of said controlled rectifier and hence a minimum current to said motor, and a bleeder resistor connected to said speed reference voltage to supply a bleeder reset current through said saturable reactor during said given period in order to increase the reset of said saturable reactor to achieve a minimum operating speed of said motor.

10. A motor control system for a shunt motor having an armature winding operable from a rectified single phase alternating current source comprising, in combination, means for developing from said alternating current source a variable direct current speed reference voltage, a semiconductor controlled rectifier for supplying half-wave energy from said alternating current source to said armature winding, a gate and a cathode on said controlled rectifier, a control circuit connected to said gate and cathode to control the firing of said controlled rectifier, a saturable reactor in said control circuit, means in said control circuit applying a voltage from said alternating current source to said gate through said saturable reactor to saturate same to fire said controlled rectifier during the half cycles of positive applied voltage on the anode of said controlled rectifier, a transistor having emitter, collector and base electrodes, means connecting said emitter to said gate, means in said control circuit comparing said speed reference voltage and the voltage of said armature winding to control the current through said transistor during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period biasing said transistor to prevent conduction therethrough and thence to prevent reset of said saturable reactor during said given period, a maximum amount of reset of said reactor being required to obtain a maximum delay in the firing angle of said controlled rectifier and hence a minimum current to said motor, and a bleeder resistor bypassing said transistor and connected to said speed reference voltage to supply a bleeder reset current through said saturable reactor during said given period in order to increase the reset of said saturable reactor to achieve a minimum operating speed of said motor.

11. A motor control system for a shunt motor having an armature winding and a field winding both operable from a rectified single phase alternating current source comprising, in combination, half-wave rectifier means for energizing said field winding, means for developing from said alternating current source a variable direct current speed reference voltage, a silicon controlled rectifier for supplying half-wave energy from said alternating current source to said armature winding, a gate and a cathode on said controlled rectifier, a control circuit connected to said gate and cathode to fire said controlled rectifier, a saturable reactor in said control circuit, means in said control circuit applying a voltage from said alternating current source to said gate through said saturable reactor to saturate same to fire said controlled rectifier during the half cycles of positive applied voltage on the anode of said controlled rectifier, a transistor having emitter, collector and base electrodes, means connecting said emitter to said gate and said collector to said saturable reactor, means in said control circuit comparing said speed reference voltage with the voltage of said armature winding to control the current through said transistor during the opposite half cycles to rest said saturable reactor, said armature winding being inductive and having inductive carryover of current through said armature winding and through said controlled rectifier partially into said opposite half cycles for a given period of electrical degrees, said conduction through said controlled rectifier during said given period biasing said transistor to prevent conduction therethrough and thence to prevent reset of said saturable reactor during said given period, a maximum amount of reset of said reactor being required to obtain a maximum delay in the firing angle of said controlled rectifier and hence a minimum speed of said motor, and a bleeder resistor bypassing said transistor base and collector and connected to said speed reference voltage to supply a bleeder reset current through said saturable reactor during said given period in order to increase the reset of said saturable reactor to achieve a minimum operating speed of said motor.

12. A motor control circuit for an electric motor having an armature winding operable from a rectified alternating current source, said control circuit comprising, in combination, a semiconductor controlled rectifier having an anode, gate and cathode, firing means to fire said controlled rectifier during the half cycles of positive applied source voltage on the anode of said controlled rectifier, means for developing from said alternating current source a variable reference voltage, a discharge impedance, and means utilizing said reference voltage to control said firing means, switch means alternatively in an off position connecting said capacitor across said discharge impedance and in an on position connecting said gate to said firing means to permit firing current to be applied to said gate from said firing means.

13. A motor control circuit for an electric motor having an armature winding operable from a rectified alternating current source, said control circuit comprising, in combination, a semiconductor controlled rectifier having an anode, gate and cathode, firing means to fire said controlled rectifier during the half cycles of positive applied source voltage on the anode of said controlled rectifier, means including a capacitor for developing from said alternating current source a variable direct current reference voltage, means utilizing said reference voltage to control said firing means, a discharge impedance, and switch means alternatively in an off position connecting said capacitor across said discharge impedance and in an on position connecting said capacitor to said source to slowly charge said capacitor for a gradual acceleration of said motor.

14. A motor control circuit for an electric motor having an armature winding operable from a rectified alternating currenet source, said control circuit comprising, in combination, a semiconductor controlled rectifier having an anode, gate and cathode, a saturable reactor connected to said gate and cathode, means to saturate said saturable reactor to fire said controlled rectifier during the half cycles of poistive applied source voltage on the anode of said controlled rectifier, means including a capacitor for developing from said alternating current source a variable direct current reference voltage, means comparing said reference voltage and a voltage responsive to a condition of said motor to control the current during the opposite half cycles to reset said saturable reactor, a discharge impedance, and switch means alternatively in an off position connecting said capacitor across said discharge impedance and in an on position connecting said gate to said saturable retactor to permit firing current to be applied to said gate from said saturable reactor.

15. A motor control circuit for an electric motor having an armature winding operable from a rectified alternating current source, said control circuit comprising, in combination, a semiconductor controlled rectifier having an anode, gate and cathode, a saturable reactor connected to said gate and cathode, means to saturate said saturable reactor to fire said controlled rectifier during the half cycles of positive applied source voltage on the anode of said controlled rectifier, means including a capacitor for developing from said alternating current source a variable direct current reference voltage, means comparing said reference voltage and a voltage responsive to a condition of said motor to control the current during the opposite half cycles to reset said saturable reactor, a discharge impedance, and switch means alternatively in an off position connecting said capacitor across said discharge impedance and in an on position connecting said capacitor to said source to slowly charge said capacitor for a gradual acceleration of said motor.

16. A motor control circuit for an electric motor having an armature winding operable from a rectified alternating current source, said control circuit comprising, in combination, a semiconductor controlled rectifier having an anode, gate and cathode, a saturable reactor connected to said gate and cathode, means to saturate said saturable reactor to fire said controlled rectifier during the half cycles of positive applied source voltage on the anode of said controlled rectifier, means including a capacitor for developing from said alternating current source a variable direct current reference voltage, means comparing said reference voltage and a voltage responsive to a condition of said motor to control the current during the opposite half cycles to reset said saturable reactor, a discharge impedance, a double-pole double-throw switch, one pole of said switch alternatively in an off position connecting said capacitor across said discharge impedance and in an on position connecting said capacitor to said source to slowly charge said capacitor for a gradual acceleration of said motor, and the second pole of said switch alternatively in the off position connecting said gate to said cathode and in said on position connecting said gate to said saturable reactor to permit firing current to be applied to said gate from said saturable reactor.

17. A motor control circuit for an electric motor having an armature winding operable on half wave energy from a single phase alternating current source, said control circuit comprising, in combination, a semiconductor controlled rectifier having an anode, gate and cathode, a saturable reactor connected to said gate and cathode, means to saturate said saturable reactor to fire said controlled rectifier during the half cycles of positive applied voltage on the anode of said controlled rectifier, means including a potentiometer and a capacitor for developing from said alternating current source a variable direct current speed reference voltage, a transistor connected to said saturable reactor, means comparing said speed reference voltage and a voltage responsive to the voltage of said armature winding to control the current through said transistor during the opposite half cycles to reset said saturable reactor, a double-pole double-throw switch, a discharge resistor, one pole of said switch alternatively in an off position connecting said capacitor across said discharge resistor and in an on position connecting said capacitor to said potentiometer to slowly charge said capacitor for a gradual acceleration of said motor, and the second pole of said switch alternatively in the off position connecting said gate to said cathode and in said on position connecting said gate to said saturable reactor to permit firing current to be applied to said gate from said saturable reactor.

18. A motor control circuit for an electric motor having an armature winding operable from a rectified alternating current source, said control circuit comprising, in combination, a controlled rectifier, having a gate and cathode, a saturable reactor connected to control the firing of said controlled rectifier, means to saturate said saturable reactor to fire said controlled rectifier during the half cycles of positive applied voltage on the anode of said controlled rectifier, means deriving a control voltage across a capacitor from said alternating current source, a semiconductor amplifier connected to said reactor, means connecting said control voltage in series with and in opposition to the voltage of said armature winding and through said cathode-gate path of said controlled rectifier to said amplifier to control the amount of reset current through said saturable reactor to control the firing angle of said controlled rectifier, a discharge impedance, switch means alternatively in an off position connecting said capacitor across said discharge impedance and in an on position connecting said capacitor to said control voltage to slowly charge said capacitor for a gradual acceleration of said motor, said switch means additionally in the off-position connecting said gate to said cathode and in said on position connecting said gate to said saturable reactor to permit firing current to be applied to said gate from said saturable reactor, a maximum amount of reset of said reactor being required to obtain a maximum delay in the firing angle of said controlled rectifier and hence a minimum current to said motor, and a bleeder impedance connected to said control voltage to supply a bleeder reset current through said saturable reactor during the opposite half cycles in order to increase the reset of said saturable reactor to achieve a minimum current to said motor.

19. A motor control circuit for an electric motor having an armature winding operable from a rectified alternating current source, said control circuit comprising, in combination, a controlled rectifier having a gate and cathode, a saturable reactor connected to control the firing of said controlled rectifier.

means to saturate said saturable reactor to fire said controlled rectifier during the half cycles of positive applied voltage on the anode of said controlled rectifier, means including a capacitor deriving a control voltage from said alternating current source, a transistor having a base and having an emitter connected to said gate, means connecting said control voltage in series with a voltage responsive to a condition of said motor and through said cathode-gate path of said controlled rectifier to said base and emitter electrodes of said transistor to establish the conduction periods of said transistor to control the amount of reset current through said saturable reactor to control the firing angle of said controlled rectifier, a double-pole double-throw switch, a discharge impedance, one pole of said switch alternatively in an off position connecting said capacitor across said discharge impedance and in an on position connecting said capacitor to said control voltage to slowly charge said capacitor for a gradual acceleration of said motor, the second pole of said switch alternatively in the off position connecting said gate to said cathode and in said on position connecting said gate to said saturable reactor to permit firing current to be applied to said gate from said saturable reactor, said armature winding being inductive and having inductive carryover of current through said armature winding and through said controlled rectifier partially into said opposite half cycles for a given period of electrical degrees, said conduction through said controlled rectifier during said given period conditioning said amplifier to inhibit conduction therethrough and thence to inhibit reset of said saturable reactor during said given period, a maximum amount of reset of said reactor being required to obtain a maximum delay in the firing angle of said controlled rectifier and hence a minimum current to said motor, and a bleeder resistor connected to said control voltage to supply a bleeder reset curent through said saturable reactor during said given period in order to increase the reset of said saturable reactor to achieve a minimum current to said motor.

20. A motor control circuit for an electric motor having an armature winding operable on half wave energy from a single phase alternating current source, said control circuit comprising, in combination, a semiconductor controlled rectifier having an anode, gate and cathode, a saturable reactor connected to said gate and cathode, means to saturate said saturable reactor to fire said controlled rectifier during the half cycles of positive applied voltage on the anode of said controlled rectifier, means for developing from said alternating current source a variable direct current speed reference voltage, a transistor having emitter, collector and base electrodes, means connecting said emitter to said gate and said collector to said reactor, means connecting said speed reference voltage in series with and in opposition to the voltage of said armature winding and through said cathode-gate path of said controlled rectifier to said base and emitter electrodes of said transistor to establish the conduction periods of said transistor during the opposite half cycles to control the amount of reset current through said saturable reactor to control the firing angle of said controlled rectifier, said armature winding being inductive and having inductive carryover of current through said armature winding and through said controlled rectifier partially into said opposite half cycles for a given period of electrical degrees, said conduction through said controlled rectifier during said given period biasing said transistor to prevent conduction therethrough and thence to prevent reset of said saturable reactor during said given period, a maximum amount of reset of said reactor being required to obtain a maximum delay in the firing angle of said controlled rectifier and hence a minimum current to said motor, and a bleeder resistor connected to said speed reference voltage to supply bleeder reset current through said saturable reactor during said given period in order to increase the reset of said saturable reactor to achieve a minimum current to said motor.

21. A motor control circuit for an electric motor having an armature winding operable on half wave energy from a single phase alternating current source, said control circuit comprising, in combination, a semiconductor controlled rectifier having an anode, gate and cathode, a saturable reactor connected to said gate and cathode, means to saturate said saturable reactor to fire said controlled rectifier during the half cycles of positive applied voltage on the anode of said controlled rectifier, means for developing from said alternating current source a variable direct current speed reference voltage, a transistor having emitter, collector and base electrodes, means connecting said emitter to said gate, means connecting said speed reference voltage in series with and in opposition to the voltage of said armature winding and through said cathode-gate path of said controlled rectifier to said base and emitter electrodes of said transistor to establish the conduction periods of said transistor to control the amount of reset current through said saturable reactor to control the firing angle of said controlled rectifier, said speed reference voltage including a potentiometer, a double-pole double-throw switch, a capacitor and a discharge resistor, one pole of said switch alternatively in an off position connecting said capacitor across said discharge resistor and in an on position connecting said capacitor to said potentiometer to slowly charge said capacitor for a gradual acceleration of said motor, and the second pole of said switch alternatively in the off position connecting said gate to said cathode and in said on position connecting said gate to said saturable reactor to permit firing current to be applied to said gate from said saturable reactor.

22. A motor control circuit for an electric motor having an armature winding operable on half wave energy from a single phase alternating current source, said control circuit comprising, in combination, a semiconductor controlled rectifier having an anode, gate and cathode, a saturable reactor connected to said gate and cathode, means to saturate said saturable reactor to fire said controlled rectifier during the half cycles of positive applied voltage on the anode of said controlled rectifier, means for developing from said alternating current source a variable direct current speed reference voltage, a transistor connected to said saturable reactor, means comparing said speed reference voltage and a voltage responsive to the voltage of said armature winding to control the current through said transistor during the opposite half cycles to reset said saturable reactor, said armature winding being inductive and having inductive carryover of current through said armature winding and through said controlled rectifier partially into said opposite half cycles for a given period of electrical degrees, said conduction through said controlled rectifier during said given period biasing said transistor to prevent conduction therethrough and hence to prevent reset of said saturable reactor during said given period, a maximum amount of reset of said reactor being required to obtain a maximum delay in the firing angle of said controlled rectifier and hence a minimum current to said motor, a bleeder resistor connected to said speed reference voltage to supply a bleeder reset current through said saturable reactor during said given period in order to increase the reset of said saturable reactor to achieve a minimum operating speed of said motor, said speed reference voltage including a potentiometer, a double-pole double-throw switch, a capacitor and a discharge resistor, one pole of said switch alternatively in an off position connecting said capacitor across said discharge resistor and in an on position connecting said capacitor to said potentiometer to slowly charge said capacitor for a gradual acceleration of said motor, the second pole of said switch alternatively in the off position connecting said gate to said cathode and in said on position connecting said gate to said saturable reactor to permit firing current to be applied to said gate from said saturable reactor.

23. A motor control circuit for an electric motor having an armature winding operable on half wave energy from a single phase alternating current source, said control circuit comprising, in combination, a semiconductor controlled rectifier having an anode, gate and cathode,
a saturable reactor connected to said gate and cathode,
means to saturate said saturable reactor to fire said controlled rectifier during the half cycles of positive applied voltage on the anode of said controlled rectifier,
means for developing from said alternating current source a variable direct current speed reference voltage,
a transistor having emitter, collector and base electrodes,
means connecting said emitter to said gate and said collector to said reactor,
means connecting said speed reference voltage in series with and in opposition to the voltage of said armature winding and through said cathode-gate path of said controlled rectifier to said base and emitter electrodes of said transistor to establish the conduction periods of said transistor during the opposite half-cycles to control the amount of reset current through said saturable reactor to control the firing angle of said controlled rectifier,
said armature winding being inductive and having inductive carryover of current through said armature winding and through said controlled rectifier partially into said opposite half cycles for a given period of electrical degrees,
said conduction through said controlled rectifier during said given period biasing said transistor to prevent conduction therethrough and thence to prevent reset of said saturable reactor during said given period,
a maximum amount of reset of said reactor being required to obtain a maximum delay in the firing angle of said controlled rectifier and hence a minimum current to said motor,
a bleeder resistor connected to said speed reference voltage to supply a bleeder reset current through said saturable reactor during said given period in order to increase the reset of said saturable reactor to achieve a minimum operating speed of said motor,
said speed reference voltage including a potentiometer, a double-pole double-throw switch, a capacitor and a discharge resistor,
one pole of said switch alternatively in an off position connecting said capacitor across said discharge resistor and in an on position connecting said capacitor to said potentiometer to slowly charge said capacitor for a gradual acceleration of said motor,
and the second pole of said switch alternatively in the off position connecting said gate to said cathode and in said on position connecting said gate to said saturable reactor to permit firing current to be applied to said gate from said saturable reactor.

References Cited

UNITED STATES PATENTS

| | | | |
|---|---|---|---|
| 3,024,401 | 4/1962 | Dinger | 318—345 X |
| 3,268,791 | 8/1968 | Burn et al. | 318—393 X |

FOREIGN PATENTS 939,093  10/1963  Great Britain.

ORIS L. RADER, *Primary Examiner.*

J. J. BAKER, *Assistant Examiner.*